United States Patent
Negishi

(10) Patent No.: US 12,516,219 B2
(45) Date of Patent: Jan. 6, 2026

(54) SILOXANE ACRYLATE HAVING PERFLUOROPOLYETHER GROUP

(71) Applicant: SHIN-ETSU CHEMICAL CO., LTD., Tokyo (JP)

(72) Inventor: Kazuyuki Negishi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 797 days.

(21) Appl. No.: 17/640,510

(22) PCT Filed: Oct. 10, 2019

(86) PCT No.: PCT/JP2019/039992
§ 371 (c)(1),
(2) Date: Mar. 4, 2022

(87) PCT Pub. No.: WO2021/044639
PCT Pub. Date: Mar. 11, 2021

(65) Prior Publication Data
US 2022/0340778 A1 Oct. 27, 2022

(30) Foreign Application Priority Data
Sep. 5, 2019 (JP) ................. 2019-161643

(51) Int. Cl.
*C09D 183/12* (2006.01)
*C08F 290/06* (2006.01)
*C08G 65/336* (2006.01)

(52) U.S. Cl.
CPC .......... *C09D 183/12* (2013.01); *C08F 290/06* (2013.01); *C08G 65/336* (2013.01)

(58) Field of Classification Search
CPC ...................................................... C07F 7/08
See application file for complete search history.

(56) References Cited

U.S. PATENT DOCUMENTS

| 5,461,173 A | 10/1995 | Sato et al. |
| 2010/0317875 A1 | 12/2010 | Sakano et al. |

FOREIGN PATENT DOCUMENTS

| EP | 2 157 120 A1 | 2/2010 |
| EP | 3 418 319 A1 | 12/2018 |
| JP | 4-168116 A | 6/1992 |
| JP | 5-194322 A | 8/1993 |
| JP | 7-188561 A | 7/1995 |
| JP | 7-233180 A | 9/1995 |
| JP | 11-349651 A | 12/1999 |
| JP | 2008-144144 A | 6/2008 |
| JP | 4873666 B2 | 2/2012 |
| JP | 2013-216732 A | 10/2013 |
| WO | WO 96/31791 A1 | 10/1996 |

OTHER PUBLICATIONS

Extended European Search Report for European Application No. 19944059.5, dated Sep. 5, 2023.
Honda et al. "Surface Molecular Aggregation Structure and Surface Properties of Poly (fluoroalkyl acrylate) Thin Films", Kobunshi Ronbunshu, Japanese Journal of Polymer Science, vol. 64, No. 4, Apr. 2007, pp. 181-190.
International Search Report (PCT/ISA/210) issued in PCT/JP2019/039992, dated Dec. 10, 2019.
Written Opinion of the International Searching Authority (PCT/ISA/237) issued in PCT/JP2019/039992, dated Dec. 10, 2019.

*Primary Examiner* — Michael F Pepitone
(74) *Attorney, Agent, or Firm* — Birch, Stewart, Kolasch & Birch, LLP

(57) ABSTRACT

Provided is a fluorine-containing siloxane acrylate represented by formula (1).

$$X\text{---}Z\text{---PFPE-}Z\text{---}X \quad (1)$$

[PFPE is a divalent perfluoropolyether chain, X is a group represented by formula (2)

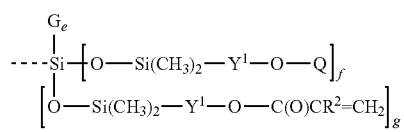

$\{Y^1$ is a divalent organic group, $R^2$ is a hydrogen atom, a fluorine atom, a methyl group, or a trifluoromethyl group, and G is a monovalent hydrocarbon group or a group represented by formula (3)

$$O\text{---}Si(CH_3)_2\text{---}Y^1\text{---}OR^1 \quad (3)$$

($R^1$ is a monovalent hydrocarbon group, and $Y^1$ is same as mentioned above. The broken line represents a bond (hereinafter, the same shall apply).) Q is a hydrogen atom or a group represented by formula (4)

$$SiR^3_3 \quad (4)$$

($R^3$ is a monovalent hydrocarbon group.) e is an integer of 0-2, f is an integer of 0-2, and g is an integer of 1-3, and e+f+g is 3.} Z is a predetermined divalent organic group].

9 Claims, No Drawings

SILOXANE ACRYLATE HAVING PERFLUOROPOLYETHER GROUP

CROSS-REFERENCE TO RELATED APPLICATIONS

This application is the National Phase of PCT International Application No. PCT/JP2019/039992, filed on Oct. 10, 2019, which claims priority under 35 U.S.C. § 119 (a) to Patent Application No. 2019-161643, filed in Japan on Sep. 5, 2019, all of which are hereby expressly incorporated by reference into the present application.

TECHNICAL FIELD

This invention relates to a photo-curable siloxane acrylate having a perfluoropolyether group, which is referred to as "fluorinated siloxane acrylate," hereinafter.

BACKGROUND ART

Prior art well-known fluorine compounds which are curable by irradiation of light such as ultraviolet radiation include polymers containing polymerizable monomers having a perfluoroalkyl group, fluorinated alkyl acrylates and fluorinated alkyl methacrylates. Typically, the compound having the following structural formula is widely used for the purposes of imparting low reflection, water/oil repellency, antifouling, abrasion resistance, mar resistance or other properties to substrate surfaces.

[Chem. 1]

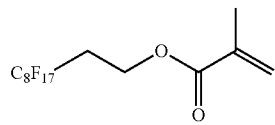

In these years, from concerns about the environmental burden, there are strengthening moves to ban the use of compounds having long-chain perfluoroalkyl groups of 8 or more carbon atoms. However, it is known from Non-Patent Document 1 that acrylic compounds having perfluoroalkyl groups of less than 8 carbon atoms provide outstandingly poor surface properties as compared with the compounds having long-chain perfluoroalkyl groups of 8 or more carbon atoms.

Meanwhile, there are known photo-curable fluorine compounds having incorporated therein perfluoropolyethers consisting of perfluoroalkylene of up to 3 carbon atoms and a contiguous ether-bondable oxygen atom. For example, Patent Document 1 proposes fluorinated acrylic compounds derived from hexafluoropropylene oxide oligomers, and Patent Document 2 discloses a urethane acrylate in the form of the reaction product of a fluorinated polyether diol and 2-isocyanatoethyl methacrylate. Because of their water/oil repellent properties, however, these fluorinated compounds are less compatible with photopolymerization initiators, non-fluorinated acrylates, and non-fluorinated organic solvents, indicating that the components which can be blended with them and their application are limited.

On the other hand, Patent Document 3 proposes a fluorinated acrylate compound having a cyclic siloxane structure and a urethane structure which is highly compatible with non-fluorinated solvents. From the aspect of blending this compound in an antireflective film-forming composition, a fluorinated acrylate compound having a lower refractive index is preferred. There is a tradeoff relationship between compatibility with non-fluorinated solvents and refractive index. The fluorinated acrylate compound of Patent Document 3 having more urethane structure incorporated therein for improving compatibility forms a film having a high refractive index, which is detrimental to low reflection. There is also a tradeoff relationship between the acrylic content and the refractive index of fluorinated acrylate. Reducing the acrylic content for the purpose of reducing the refractive index of fluorinated acrylate detracts from the strength of a film formed therefrom.

Under these circumstances, there is the desire to have a fluorinated acrylate compound which achieves a lower refractive index without detracting from compatibility with non-fluorinated solvents and without reducing the acrylic content.

PRIOR ART DOCUMENTS

Patent Documents

Patent Document 1: JP-A H05-194322
Patent Document 2: JP-A H11-349651
Patent Document 3: JP 4873666

Non-Patent Documents

Non-Patent Document 1: Japanese Journal of Polymer Science, Vol. 64, No. 4, pp.181-190 (A pr. 2007)

SUMMARY OF INVENTION

Technical Problem

An object of the invention, which has been made under the above-mentioned circumstances, is to provide a fluorinated siloxane acrylate having a perfluoropolyether group which achieves a good compatibility with non-fluorinated solvents and a low refractive index while maintaining an acrylic content.

Solution to Problem

Making extensive investigations to solve the outstanding problems, the inventor has found that the fluorinated siloxane acrylate defined below achieves a good compatibility with non-fluorinated solvents and a low refractive index while maintaining an acrylic content. The invention is predicated on this finding.

The invention is defined below.

1. A fluorinated siloxane acrylate having the formula (1):

[Chem. 2]

$$X\text{—}Z\text{—}PFPE\text{—}Z\text{—}X \quad (1)$$

wherein PFPE is a divalent perfluoropolyether chain having a number average molecular weight of 500 to 30,000, X is each independently a group having the formula (2):

[Chem. 3]

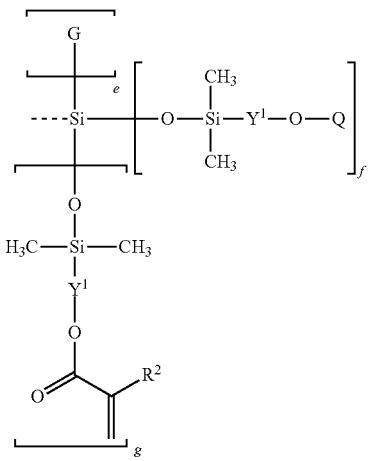

wherein $Y^1$ is each independently a divalent organic group which may contain an ether bond and have a cyclic or branched structure, $R^2$ is each independently hydrogen, fluorine, methyl or trifluoromethyl, and G is each independently a $C_1$-$C_{12}$ alkyl group or a group having the formula (3):

[Chem. 4]

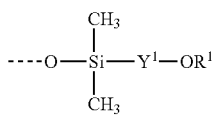

wherein $R^1$ is a $C_1$-$C_{12}$ monovalent hydrocarbon group, $Y^1$ is as defined above, and the broken line designates a valence bond, Q is hydrogen or a group having the formula (4):

[Chem. 5]

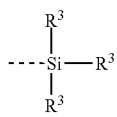

wherein $R^3$ is each independently a $C_1$-$C_{12}$ monovalent hydrocarbon group and the broken line designates a valence bond, e is an integer of 0 to 2, f is an integer of 0 to 2, and g is an integer of 1 to 3, and e+f+g=3, and the broken line designates a valence bond, Z is each independently a divalent organic group having any one of the following formulae:

[Chem. 6]

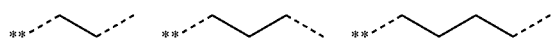

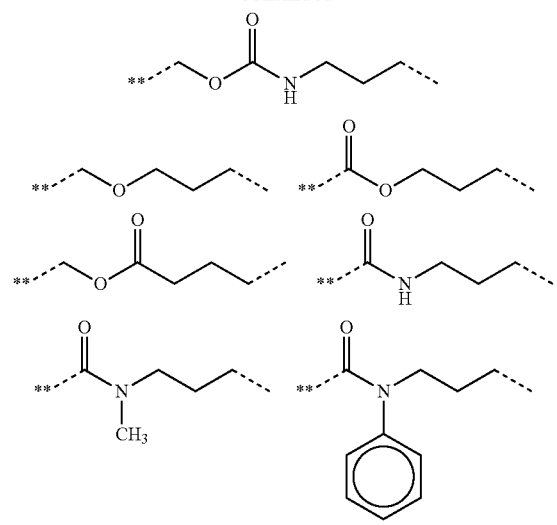

wherein the broken line designates a valence bond, and the double asterisk (**) designates a point of attachment to the PFPE.

2. The fluorinated siloxane acrylate of 1 wherein PFPE is a perfluoropolyether chain having a number average molecular weight of 1,000 to 5,000, represented by the following formula:

[Chem. 7]

$$CF_2(OCF_2)_a(OCF_2CF_2)_bOCF_2 \qquad (6)$$

wherein "a" is a number of at least 1, b is a number of at least 1, a/b is a number from 1/10 to 10/1, the arrangement of repeating units in parentheses with a and b may be arbitrary, and the broken line designates a valence bond.

3. The fluorinated siloxane acrylate of 1 or 2 wherein Z is a divalent organic group having any one of the following formulae:

[Chem. 8]

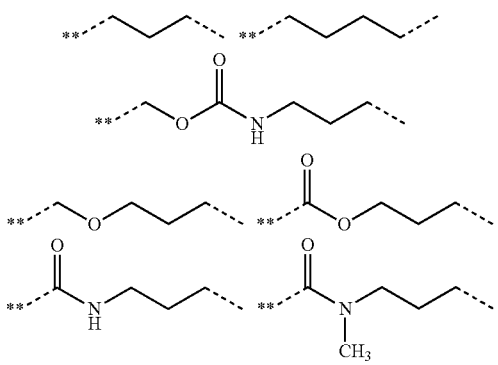

wherein the broken line designates a valence bond, and the double asterisk (**) designates a point of attachment to the PFPE.

4. The fluorinated siloxane acrylate of any one of 1 to 3 wherein $Y^1$ is a divalent organic group having any one of the following formulae:

[Chem. 9]

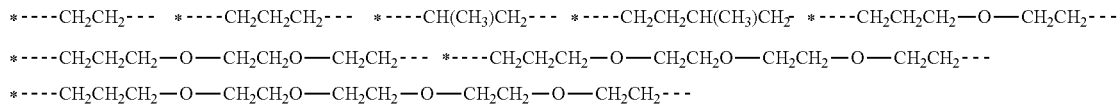

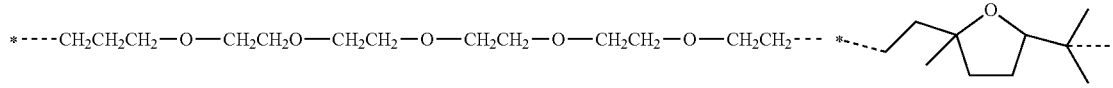

\*----CH$_2$CH$_2$CH$_2$—O—CH$_2$CH$_2$O—CH$_2$CH$_2$—O—CH$_2$CH$_2$—O—CH$_2$CH$_2$---

\*----CH$_2$CH$_2$CH$_2$—O—CH$_2$CH$_2$O—CH$_2$CH$_2$—O—CH$_2$CH$_2$—O—CH$_2$CH$_2$—O—CH$_2$CH$_2$---   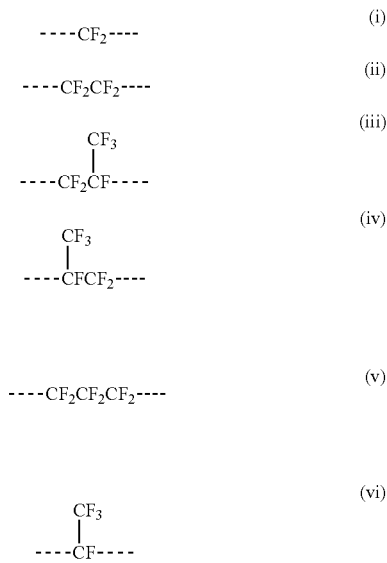

wherein the broken line designates a valence bond, and the asterisk (\*) designates a point of attachment to the silicon atom.

5. The fluorinated siloxane acrylate of any one of 1 to 4 wherein e is 1 or 2, G is a $C_1$-$C_6$ alkyl group or a group having formula (3) wherein $R^1$ is methyl, ethyl or n-propyl.

6. The fluorinated siloxane acrylate of 5 wherein G is a $C_1$-$C_3$ alkyl group.

7. The fluorinated siloxane acrylate of any one of 1 to 4 wherein e is 0.

8. A coating composition comprising the fluorinated siloxane acrylate of any one of 1 to 7.

9. The coating composition of 8, further comprising an acrylate or urethane acrylate other than the fluorinated siloxane acrylate of any one of 1 to 7.

10. An article comprising a coating in the form of a cured product of the coating composition of 8 or 9.

Advantageous Effects of Invention

The fluorinated siloxane acrylate of the invention meets both a compatibility with non-fluorinated organic compounds and a low refractive index despite an acrylic content equivalent to those of prior art fluorinated acrylates and cures with light into a cured product having water/oil repellency. It is thus useful as a resin for forming an antireflective coating or an additive to hard coat compositions.

DESCRIPTION OF EMBODIMENTS

Now, the invention is described in detail.
[Fluorinated Siloxane Acrylate]
The invention provides a fluorinated siloxane acrylate having the formula (1).
[Chem. 10]

$$X—Z-PFPE-Z—X \quad (1)$$

In formula (1), PFPE is a divalent perfluoropolyether chain having a number average molecular weight of 500 to 30,000, preferably 1,000 to 5,000, and specifically of the structure wherein perfluoroalkylene groups and oxygen atoms are alternately connected, represented by the following structural formula (5). It is noted that the number average molecular weight (Mn) is measured by gel permeation chromatography (GPC) versus polystyrene standards.

[Chem. 11]

(5)

In formula (5), A which may be the same or different is a $C_1$-$C_3$ perfluoroalkylene group, the arrangement of A is arbitrary, and n is a number of at least 1, preferably 6 to 60, more preferably 10 to 35. The broken line designates a valence bond (the same holds true, hereinafter).

Examples of the $C_1$-$C_3$ perfluoroalkylene group A are shown by the following structures.

[Chem. 12]

----CF$_2$---- (i)

----CF$_2$CF$_2$---- (ii)

----CF$_2$CF(CF$_3$)---- (iii)

----CF(CF$_3$)CF$_2$---- (iv)

----CF$_2$CF$_2$CF$_2$---- (v)

----CF(CF$_3$)---- (vi)

Preferably, A is a perfluoromethylene or perfluoroethylene group for the reasons that the perfluoropolyether chain contains many oxygen atoms serving as a flex point developing sliding properties and that a branched structure prohibiting flexing motion of the chain is not included.

It is more preferred for industrial availability that the divalent perfluoropolyether chain represented by PFPE be a chain of the following formula (6) in which oxydifluoromethylene groups and oxytetrafluoroethylene groups coexist.
[Chem. 13]

(6)

In formula (6), the number (a) of perfluorooxymethylene groups is a number of a≥1, and the number (b) of perfluorooxyethylene groups is a number of b≥1. The ratio (a/b) of the number (a) of perfluorooxymethylene groups to the number (b) of perfluorooxyethylene groups is preferably a number from 1/10 to 10/1, more preferably from 3/10 to 10/3 though not limited thereto. The arrangement of repeat units within the parentheses with "a" and "b" is arbitrary.

X is each independently a group having the formula (2).

[Chem. 14]

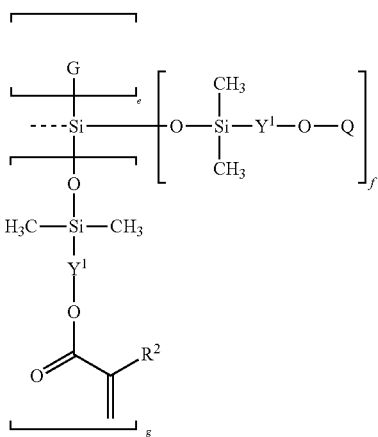

(2)

$R^2$ is each independently hydrogen, fluorine, methyl or trifluoromethyl, preferably hydrogen or methyl, most preferably hydrogen.

$Y^1$ is each independently a divalent organic group which may contain an ether bond (exclusive of a group containing O at the end point of attachment to an oxygen atom to form a —O—O—linkage) and have a cyclic or branched structure. $Y^1$ is selected from, for example, $C_2$-$C_{20}$, preferably $C_2$-$C_{10}$ alkylene group, with groups of the structural formulae shown below being preferred.

[Chem. 15]

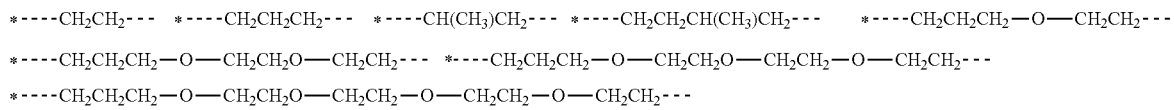

Herein the asterisk (*) designates a point of attachment to the silicon atom (the same holds true, hereinafter).

Most preferably, $Y^1$ is a divalent organic group having any one of the structural formulae shown below.

[Chem. 16]

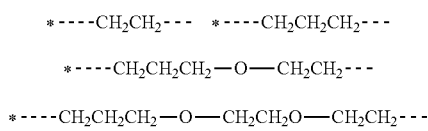

G is each independently a $C_1$-$C_{12}$ alkyl group or a group having the formula (3).

[Chem. 17]

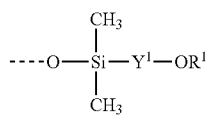

(3)

Examples of the alkyl group G include methyl, ethyl, n-propyl, i-propyl, n-butyl, s-butyl, t-butyl, n-pentyl, n-hexyl, and cyclohexyl. G is preferably a $C_1$-$C_6$, more preferably $C_1$-$C_4$, even more preferably $C_1$-$C_3$ alkyl group, most preferably methyl, ethyl or n-propyl.

In formula (3), $R^1$ is a $C_1$-$C_{12}$ monovalent hydrocarbon group, examples of which include alkyl groups such as methyl, ethyl, n-propyl, i-propyl, n-butyl, s-butyl, t-butyl, n-pentyl, n-hexyl, and cyclohexyl, and aryl groups such as phenyl. $R^1$ is preferably a $C_1$-$C_3$ alkyl group, more preferably methyl, ethyl or n-propyl.

Q is hydrogen or a group having the formula (4).

[Chem. 18]

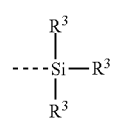

(4)

$R^3$ is each independently a $C_1$-$C_{12}$ monovalent hydrocarbon group, examples of which are as exemplified above for $R^1$. $R^3$ is preferably a $C_1$-$C_3$ alkyl group, more preferably methyl, ethyl or n-propyl.

The subscript e is an integer of 0 to 2, preferably 0, f is an integer of 0 to 2, and g is an integer of 1 to 3, and e+f+g=3.

Z is each independently a divalent organic group having any one of the following formulae.

[Chem. 19]

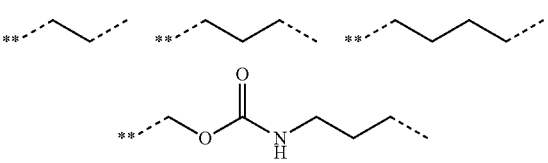

-continued

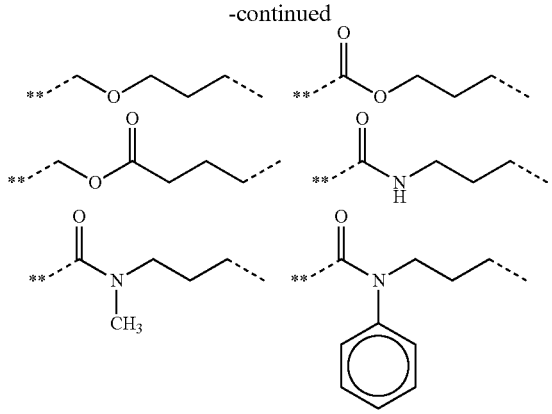

Herein the double asterisk (**) designates a point of attachment to the PFPE (the same holds true hereinafter).

Inter alia, groups of the following formulae are preferred.

[Chem. 20]

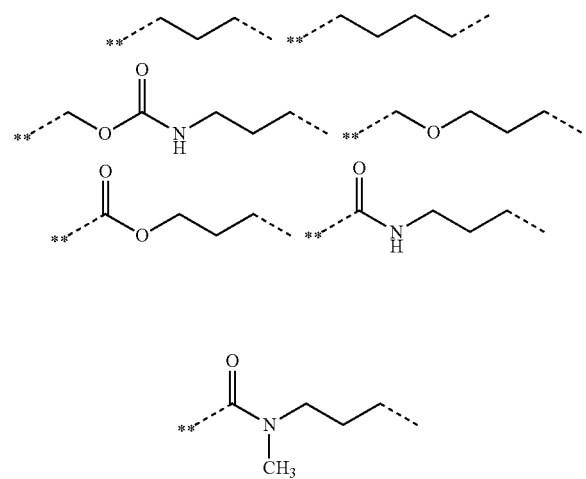

Of these, groups of the following formulae are especially preferred.

[Chem. 21]

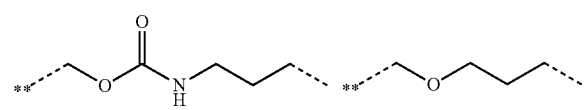

-continued

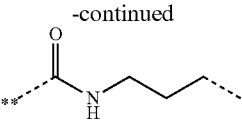

[Preparation Method]

The fluorinated siloxane acrylate of the invention can be prepared, for example, by the following method.

[1] Synthesis of Hydrogensiloxane

First, co-hydrolytic condensation is carried out between a perfluoropolyether having alkoxysilyl groups at both ends, represented by the following formula (7) and a compound having a Si—H bond, represented by the following formula (8a) and/or (8b) to produce a hydrogensiloxane having a perfluoropolyether group, represented by the following formula (9).

[Chem. 22]

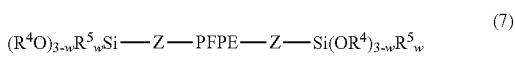 (7)

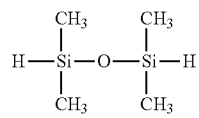 (8a)

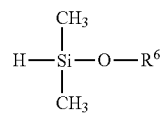 (8b)

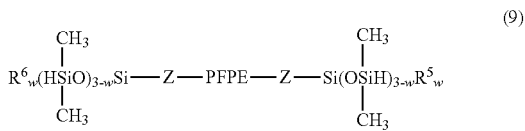 (9)

Herein, $R^4$ and $R^5$ are each independently a $C_1$-$C_{12}$, preferably $C_1$-$C_6$, more preferably $C_1$-$C_4$ alkyl group, $R^6$ is a $C_1$-$C_{12}$, preferably $C_1$-$C_6$, more preferably $C_1$-$C_4$ alkyl group, w is each independently an integer of 0 to 2, PFPE and Z are as defined above (the same holds true, hereinafter).

Examples of the groups $R^4$, $R^5$ and $R^6$ include alkyl groups such as methyl, ethyl, n-propyl, i-propyl, n-butyl, s-butyl, t-butyl, n-pentyl, n-hexyl, and cyclohexyl, preferably methyl, ethyl, n-propyl and n-butyl.

Examples of the resulting polyfunctional hydrogensiloxane include those of the following formulae, but are not limited thereto.

[Chem. 23]

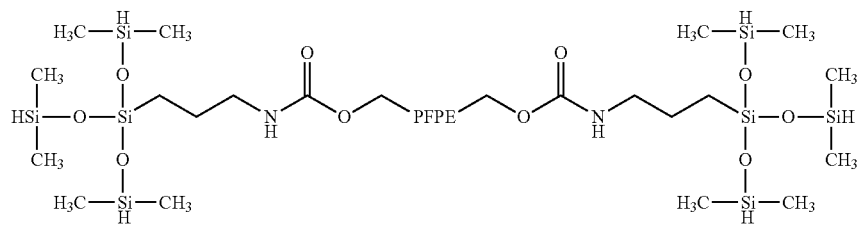

-continued

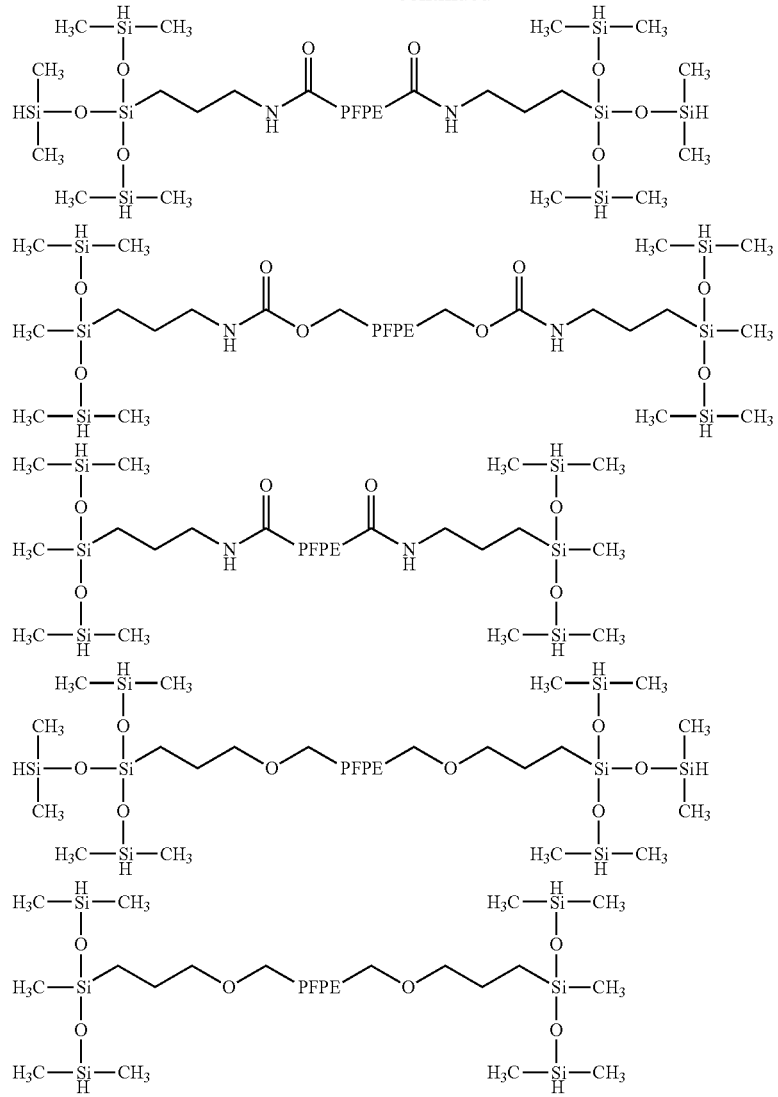

With respect to the amounts of compound (8a) and/or (8b) and compound (7) used during co-hydrolysis, co-hydrolysis is preferably carried out using at least 2 equivalents calculated as silicon of compound (8a) and/or (8b) per equivalent of alkoxy group in compound (7) in order to prevent compound (7) from mutual crosslinking, after which the unreacted compound (8a) and/or (8b) is removed by vacuum distillation. More preferably, the reaction is carried out under the condition that 2 to 10 equivalents, even more preferably 2 to 6 equivalents as silicon of compound (8a) and/or (8b) is present per equivalent of alkoxy group in compound (7). It is noted that when compounds (8a) and (8b) are used together, the amounts of compounds (8a) and (8b) added are preferably in a weight ratio (8a)/(8b) of from 50/1 to 1/50.

In the practice of co-hydrolysis, a hydrolysis catalyst is preferably used. The hydrolysis catalyst used herein is selected from prior art well-known catalysts, for example, acids such as hydrochloric acid, nitric acid, sulfuric acid, hydrogen halides, carboxylic acid, and sulfonic acid; acidic or weakly acidic inorganic salts; solid acids such as ion exchange resins; inorganic bases such as ammonia and sodium hydroxide; organic bases such as tributylamine, 1,5-diazabicyclo[4.3.0]nonene-5 (DBN), 1,8-diazabicyclo[5.4.0]undecene-7 (DBU); and organic metal compounds such as organotin compounds, organotitanium compounds, organozirconium compounds, and organoaluminum compounds, which may be used alone or in admixture.

Herein, preference is given to acids such as hydrochloric acid, nitric acid, sulfuric acid, and methanesulfonic acid, and organic metal compounds such as organotin compounds, organotitanium compounds, and organoaluminum compounds. Illustrative examples of the organic metal compounds include dibutyltin dilaurate, dibutyltin dioctate, dibutyltin diacetate, dioctyltin dilaurate, dioctyltin dioctate, dioctyltin diacetate, dibutyltin bisacetylacetate, dioctyltin bisacetyllaurate, tetrabutyl titanate, tetranonyl titanate, tetrakis(ethylene glycol) methyl ether titanate, tetrakis(ethylene glycol) ethyl ether titanate, bis(acetylacetonyl)dipropyl titanate, acetylacetone aluminum, aluminum bis(ethylacetoacetate) mono-n-butylate, aluminum ethylacetoacetate di-n-butylate, aluminum tris(ethylacetoacetate), and hydrolyzates thereof. Of these, preference is given, from the standpoint of reactivity, to acids such as hydrochloric acid, nitric acid, and methanesulfonic acid; tetrabutyl titanate, aluminum ethylacetoacetate di-n-butylate, aluminum bis (ethylacetoacetate) mono-n-butylate, and hydrolyzates thereof, with methanesulfonic acid being most preferred.

Although the amount of the hydrolysis catalyst used is not particularly limited, it is preferably 0.001 to 15 mol %, more preferably 0.001 to 10 mol % based on the moles of alkoxy group on silicon atom in the compound of formula (7).

The co-hydrolytic condensation reaction may be carried out in the presence of an organic solvent. The organic solvent is not particularly limited as long as it is compatible with the foregoing reactants. Examples thereof include aromatic hydrocarbons such as toluene and xylene; hydrocarbons such as hexane and octane; ketones such as methyl ethyl ketone and methyl isobutyl ketone; esters such as ethyl acetate and isobutyl acetate; alcohols such as methanol, ethanol, isopropanol, butanol, isobutanol and t-butanol; and fluorochemical solvents.

Suitable fluorochemical solvents include fluorinated aromatic hydrocarbons such as 1,3-bis(trifluoromethyl)benzene and triifluorotoluene; perfluorocarbons of 3 to 12 carbon atoms such as perfluorohexane and perfluoromethylcyclohexane; hydrofluorocarbons such as 1,1,2,2,3,3,4-heptafluorocyclopentane and 1,1,1,2,2,3,3,4,4,5,5,6,6-tridecafluorooctane; hydrofluoro ethers such as $C_3F_7OCH_3$, $C_4F_9OCH_3$, $C_4F_9OC_2H_5$, and $C_2F_5CF(OCH_3)C_3F_7$; and poly(perfluoroalkylene ether) solvents such as Fomblin and Galden (Solvay S.A.), Demnum (Daikin Industries, Ltd.), and Krytox (Chemours Co.).

In the hydrolysis reaction, water is preferably added. The amount of water added during hydrolysis is preferably 1 to 5 times, more preferably 1.5 to 3 times the amount necessary to hydrolyze all alkoxy groups in the reactant.

The reaction conditions are preferably at −5° C. to 20° C. for 15 to 300 minutes, more preferably at 0° C. to 10° C. for 30 to 180 minutes.

[2] Hydrosilylation Reaction

Next, addition reaction of an olefin compound having the following formula (10a) and optionally an olefin compound having the following formula (10b) to the hydrogensiloxane (9) is carried out by hydrosilylation.

[Chem. 24]

$$R^7\text{—}Y^2\text{—}O\text{-}Q \quad (10a)$$

$$R^7\text{—}Y^2\text{—}O\text{—}R^1 \quad (10b)$$

$R^7$ is an olefin group capable of addition reaction with Si—H groups, preferably a $C_2$-$C_8$ alkenyl group, examples of which include vinyl, allyl, 1-propenyl, isopropenyl, 1-butenyl and isobutenyl. Of these, vinyl and allyl are preferred. $Y^2$ is a single bond, or a divalent organic group which may contain an ether bond (exclusive of a group containing O at the end point of attachment to an oxygen atom to form a —O—O-linkage) and have a cyclic or branched structure. Examples of the divalent organic group $Y^2$ include $C_1$-$C_{18}$, preferably $C_1$-$C_8$ alkylene groups. Illustrative examples include groups of the following structural formulae. Q and $R^1$ are as defined above.

Herein the dot (–) designates a point of attachment to $R^7$ (the same holds true, hereinafter).

Most preferably, $Y^2$ is a single bond or a divalent organic group having any one of the structural formulae shown below.

[Chem. 26]

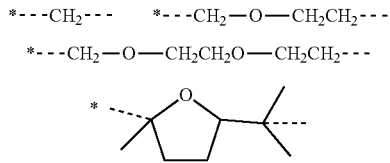

Examples of the compound having formula (10a) are given below.

[Chem. 27]

$CH_2\text{=}CHCH_2OSi(CH_3)_3$ $CH_2\text{=}CHCH_2OCH_2CH_2OH$

The amount of compound (10a) added is preferably 0.2 to 5 equivalents, more preferably 0.5 to 3 equivalents per equivalent of hydrosilyl group in hydrogensiloxane (9).

Examples of the compound having formula (10b) are given below.

[Chem. 28]

$CH_2\text{=}CHCH_2OCH_3$ $CH_2\text{=}CHCH_2OCH_2CH_2OCH_3$ $CH_2\text{=}CHCH_2OCH_2CH_2OCH_2CH_2OCH_3$ $CH_2\text{=}CHCH_2OCH_2CH_2OCH_2CH_2OCH_2CH_2OCH_3$ $CH_2\text{=}CHCH_2OCH_2CH_2OCH_2CH_2OCH_2$
$CH_2OCH_2CH_2OCH_3$ When used, the amount of compound (10b) added is preferably 0.1 to 0.8 equivalent, more preferably 0.1 to 0.5 equivalent per equivalent of hydrosilyl group in hydrogensiloxane (9).

When compounds (10a) and (10b) are used together, the amounts of compounds (10a) and (10b) added are preferably in a weight ratio (10a)/(10b) of from 50/1 to 0.5/1.

Although the addition reaction can be carried out in a solventless system, the reaction system may be diluted with a solvent if necessary. Preferably, the dilution solvent does not inhibit hydrosilylation, the compound (11) obtained from the reaction is soluble therein, and compound (9), compound (10a) and if necessary, compound (10b) dissolve therein at the reaction temperature. Preferred examples include aromatic hydrocarbon solvents such as benzene,

[Chem. 25]

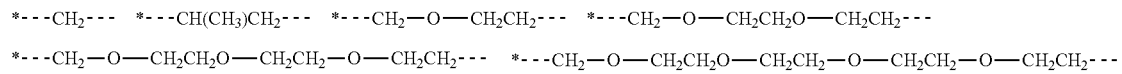

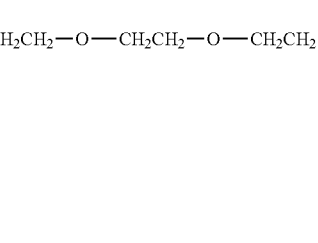

toluene and xylene; fluorine-modified aromatic hydrocarbon solvents such as m-xylene hexafluoride and benzotrifluoride; and fluorine-modified ether solvents such as methyl perfluorobutyl ether and perfluoro-2-butyltetrahydrofuran. Inter alia, toluene, xylene and m-xylene hexafluoride are preferred.

A catalyst is preferably used in the hydrosilylation reaction. Compounds containing a platinum group metal such as platinum, rhodium or palladium may be used as the catalyst. Inter alia, platinum-containing compounds are preferred. For example, hexachloroplatinic(IV) acid hexahydrate, platinum-carbonylvinylmethyl complex, platinum-divinyltetramethyldisiloxane complex, platinum-cyclovinylmethylsiloxane complex, platinum-octylaldehyde/octanol complex, complexes of chloroplatinic acid with olefins, aldehydes, vinylsiloxanes or acetylene alcohols, and platinum on active carbon carrier. The amount of the catalyst used is preferably to provide 0.1 to 5,000 ppm, more preferably 1 to 1,000 ppm of platinum group metal based on the overall weight of the reaction system.

In the addition reaction, the order of mixing the reactants is not particularly limited. Exemplary methods include a method of heating a mixture of compound (9), compound (10a), optional compound (10b), and catalyst gradually from room temperature to the addition reaction temperature; a method of heating a mixture of compound (9), compound (10a), optional compound (10b), and dilution solvent at the desired reaction temperature and then adding the catalyst thereto; a method of heating a mixture of compound (10a), optional compound (10b), and catalyst at the desired reaction temperature and then adding dropwise compound (9) thereto; and a method of heating compound (9) at the desired reaction temperature and then adding dropwise a mixture of compound (10a), optional compound (10b), and catalyst thereto. Of these, the method of heating a mixture of compound (9), compound (10a), optional compound (10b), and dilution solvent at the desired reaction temperature and then adding the catalyst thereto; and the method of heating compound (9) at the desired reaction temperature and then adding dropwise a mixture of compound (10a), optional compound (10b), and catalyst thereto are preferred. In these methods, the compounds or the mixture may be diluted with a solvent if necessary prior to use.

When addition reaction of compounds (10a) and (10b) to compound (9) is carried out, the desired procedure involves addition reaction of compound (10b) to compound (9), addition reaction with an excess of compound (10a), and purification by removal of unreacted compound (10a). Each of compound (10a) and compound (10b) as used herein may be a mixture of compounds wherein $R^7$, $Y^2$, $R^f$ and Q are different.

The addition reaction is preferably carried out at 20 to 120° C. for 30 to 300 minutes, more preferably at 50 to 100° C. for 30 to 120 minutes.

The above-mentioned method yields a compound having the following formula (11).
[Chem. 29]

$$X^0\text{—}Z\text{-PFPE-}Z\text{—}X^0 \tag{11}$$

In formula (11), $X^0$ is each independently a group of the following formula.

[Chem. 30]

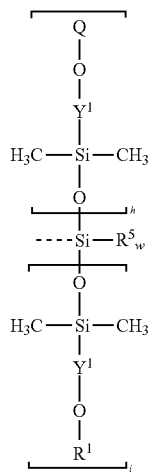

$Q$, $Y^1$, $R^1$, $R^5$, and w are as defined above; h is an integer of 1 to 3, i is an integer of 0 to 2, and h+i+w=3. Notably, formula (11) corresponds to formula (2) wherein e=w+i and f=h−g.

[3] Deprotection Reaction

When Q is a silyl group having formula (4), some or all silyl groups are deprotected and converted to hydrogen atoms, constructing reaction sites with an acid chloride compound containing (meth)acryloyl group to be subsequently reacted. As used herein, (meth)acryloyl group refers to acryloyl or methacryloyl group.

For the deprotection reaction, prior art well-known methods may be used. Exemplary methods include a method using fluoride ion, a method using an acid (Bronsted acid or Lewis acid), a method using a base (Bronsted base or Lewis base), a method of letting excessive alcohol act under neutral conditions, and a method using N-bromosuccinimide, diosobutylaluminum hydride or palladium complex. Of these, the method using an acid (Bronsted acid or Lewis acid) and the method of letting excessive alcohol act under neutral conditions are preferred, with the method of letting excessive alcohol act under neutral conditions being most preferred. Preferred examples of the alcohol used herein include methanol, ethanol, propanol, butanol and pentanol, with methanol and ethanol being more preferred. The amount of alcohol added is preferably 1 to 50 equivalents per equivalent of silyl group having formula (4). The reaction conditions are preferably at 50 to 100° C. for 60 to 1,440 minutes.

[4] Esterification

The target fluorinated siloxane acrylate having formula (1) is obtained by reacting some or all of hydroxy groups in compound (11') having formula (11) whose silyl groups are deprotected or some or all of hydroxy groups in compound (11") having formula (11) wherein Q is hydrogen with (meth)acrylic chloride having the following formula (12) to form an ester bond.

[Chem. 31]

(12)

Herein $R^2$ is as defined above.

Reaction of compound (11') or (11") with compound (12) is carried out by mixing them in the presence of a base for neutralizing hydrogen chloride byproduct at 0 to 100° C., preferably 0 to 80° C. for 30 to 180 minutes.

The type of the base is not particularly limited and examples thereof include amine compounds such as ammonia, trimethylamine, triethylamine, diisopropylamine, tripropylamine, N,N-diisopropylethylamine, tributylamine, pyridine, N,N-dimethylaminopyridine, 1,5-diazabicyclo[4.3.0]nonene-5 (DBN), and 1,8-diazabicyclo[5.4.0]undecene-7 (DBU); inorganic bases such as sodium hydrogencarbonate, potassium hydrogencarbonate, lithium hydrogencarbonate, sodium carbonate, potassium carbonate, lithium carbonate, sodium hydroxide, lithium hydroxide and potassium hydroxide; and aqueous solutions thereof. These bases are not limited to one type and a mixture of two or more types may also be used. Inter alia, triethylamine, pyridine, sodium hydrogencarbonate, potassium hydrogencarbonate, sodium hydroxide, and potassium hydroxide are preferred, with triethylamine being most preferred.

The amount of compound (12) used is preferably 1 to 10 equivalents, more preferably 1 to 5 equivalents, most preferably 1 to 3 equivalents relative to hydroxy group in compound (11') or (11").

The amount of the base used is preferably 1 to 10 equivalents, more preferably 1 to 5 equivalents, most preferably 1 to 3 equivalents relative to hydrogen chloride resulting from compound (12).

In the esterification reaction, the order of mixing the reactants is not particularly limited. Exemplary methods include a method of heating a mixture of compound (11') or (11"), compound (12), and base gradually from room temperature to the esterification reaction temperature; a method of heating a mixture of compound (11') or (11") and compound (12) at the desired reaction temperature and then adding the base thereto; a method of heating a mixture of compound (11') or (11") and base at the desired reaction temperature and then adding compound (12) thereto; a method of heating a mixture of compound (12) and base at the desired reaction temperature and then adding compound (11') or (11") thereto; and a method of heating compound (12) at the desired reaction temperature and then adding dropwise a mixture of compound (11') or (11") and base thereto. Of these, the method of heating a mixture of compound (11') or (11") and base at the desired reaction temperature and then adding dropwise compound (12) thereto is preferred.

In these methods, the reactants or the mixture may be diluted with a solvent, if necessary, prior to use. The solvent used herein is not particularly limited as long as it is inert to hydroxy group and acid chloride. Preferred examples include aromatic hydrocarbon solvents such as benzene, toluene and xylene; fluorine-modified aromatic hydrocarbon solvents such as m-xylene hexafluoride and benzotrifluoride; fluorine-modified ether solvents such as methyl perfluorobutyl ether and perfluoro-2-butyltetrahydrofuran; ketone solvents such as acetone, methyl ethyl ketone, methyl isobutyl ketone, cyclopentanone and cyclohexanone; and ether solvents such as tetrahydrofuran, diethyl ether, diisopropyl ether and dibutyl ether. Inter alia, acetone, methyl ethyl ketone, methyl isobutyl ketone, and m-xylene hexafluoride are preferred.

The fluorinated siloxane acrylate thus synthesized is structured to have an acryloyl group via an ester bond. This reduces the urethane bond, which acts to increase a refractive index, from the structure, thus making it possible to lower the refractive index without reducing the amount of acryloyl groups.

[Coating composition]

When the fluorinated siloxane acrylate of the invention is added to a coating composition, the coating surface is endowed with antifouling, fingerprint-proof, water repellent and oil repellent properties. When the fluorinated siloxane acrylate is added to a hard coat composition, for example, the amount of the fluorinated siloxane acrylate is preferably 0.01 to 20 parts by weight, more preferably 0.05 to 10 parts by weight per 100 parts by weight of a base polymer in the hard coat composition. An amount in the range ensures to form a hard coat film of full surface coverage without detracting from the hardness thereof The fluorinated siloxane acrylate of the invention is also applicable to an anti-reflection coating composition. In this embodiment, the amount of the fluorinated siloxane acrylate is preferably 20 to 500 parts by weight, more preferably 20 to 300 parts by weight per 100 parts by weight of a base polymer in the coating composition. An amount in the range ensures to form an anti-reflection film having a low refractive index while maintaining the strength thereof.

In the coating composition, an acrylate or urethane acrylate other than the inventive fluorinated siloxane acrylate may be additionally used as long as it can be mixed with the inventive fluorinated siloxane acrylate and cured.

Examples of the acrylate used herein include di- to hexafunctional (meth)acrylate compounds such as 1,6-hexane diol di(meth)acrylate, neopentyl glycol di(meth)acrylate, ethylene glycol di(meth)acrylate, isocyanuric acid ethylene oxide-modified di(meth)acrylate, isocyanuric acid ethylene oxide-modified tri(meth)acrylate, trimethylolpropane tri(meth)acrylate, pentaerythritol tri(meth)acrylate, glycerol tri(meth)acrylate, tris(meth)acryloyloxyethyl phosphate, (2,2,2-tri(meth)acryloyloxymethyl)ethyl hydrogenphthalate, glycerol tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate, and sorbitol hexa(meth)acrylate, and ethylene oxide, propylene oxide, epichlorohydrin, fatty acid, alkyl and urethane modified products of the foregoing (meth)acrylate compounds, epoxy acrylates obtained by adding acrylic acid to epoxy resins, and copolymers obtained by incorporating (meth)acryloyl groups into side chains of acrylate copolymers.

Examples of the urethane acrylate include those obtained by reacting polyisocyanate with a (meth)acrylate having a hydroxy group, those obtained by reacting polyisocyanate and a diol-terminated polyester with a (meth)acrylate having a hydroxy group, and those obtained by reacting a polyol with an excess of diisocyanate and then reacting the resulting polyisocyanate with a (meth)acrylate having a hydroxy group. Preferred are urethane acrylates obtained by reacting a (meth)acrylate having a hydroxy group which is selected from 2-hydroxyethyl (meth)acrylate, 2-hydroxy-3-acryloyloxypropyl methacrylate, and pentaerythritol triacrylate with a polyisocyanate which is selected from hexamethylene diisocyanate, isophorone diisocyanate, tolylene diisocyanate, and diphenylmethane diisocyanate.

Coating compositions comprising such acrylates or urethane acrylates are commercially available. Examples include "Beamset" from Arakawa Chemical Industries, Ltd., "Ubic" from Ohashi Chemical Industries, Ltd., "UV Coat" from Origin Co., Ltd., "Cashew UV" from Cashew Co., Ltd., "DeSolite" from JSR Corp., "Seikabeam" from Dainichiseika Color & Chem Mfg Co., Ltd., "Shikoh" from Nippon Synthetic Chemical Industry Co., Ltd., "Fujihard" from Fujikura Kasei Co., Ltd., "Diabeam" from Mitsubishi Chemical Corp., Ltd., and "Ultra-yin" from Musashi Paint Co., Ltd.

Any additives may be added to the coating composition as long as the benefits of the invention are not compromised. Suitable additives include non-reactive silicone oils, reactive silicone oils, microparticulate silicas such as non-reactive microparticulate silica, reactive microparticulate silica, non-reactive hollow microparticulate silica, and reactive hollow microparticulate silica, tackifiers such as silane coupling agents, anti-aging agents, rust inhibitors, coloring agents, surfactants, rheological modifiers, UV absorbers, IR absorbers, fluorescent agents, abrasives, perfume, fillers, pigments, dyes, levelling agents, reactive diluents, non-reactive high-molecular resins, antioxidants, UV absorbers, photo-stabilizers, defoamers, dispersants, antistatic agents, and thixotropic agents.

When blended in the coating composition, the inventive fluorinated siloxane acrylate is effective for endowing a coating surface with antifouling, water repellent, oil repellent, fingerprint-proof, and low reflective properties. There is obtained a coating which is resistant to deposition of human fats such as fingerprints, sebum and perspiration, and stains of cosmetics or the like, easy to wipe off even when stains are deposited, and effective for preventing reflection or glare. Therefore, the inventive compound is effective as an additive to a curable composition which is applied to the surface of articles that can be stained with human fats, cosmetics or the like by human contacts and which is used to form a coating film or protective film thereon.

Examples of the article include optical disks such as opto-magnetic disks, CD, LD, DVD, and Blu-ray disks; optical recording media such as hologram recording media; optical parts and devices such as eyeglass lenses, prisms, lens sheets, pellicle films, polarizers, optical filters, lenticular lenses, Fresnel lenses, antireflective films, optical fibers, and photo-couplers; image display instruments such as CRT, liquid crystal displays, plasma displays, electroluminescence (EL) displays, rear projection displays, vacuum fluorescent displays (VFD), field emission projection displays, and toner displays, specifically image display instruments such as PC, mobile phones, portable information terminals, game consoles, digital cameras, digital video cameras, automatic teller machines, cash dispensers, vending machines, automobile navigation systems, security system terminals, as well as manipulating touch panels (e.g., touch sensors and touch screens); input units for mobile phones, portable information terminals, portable music players, portable game consoles, remote controllers, controllers, keyboards, and car mount panel switches; surfaces of casings of such instruments as mobile phones, portable information terminals, cameras, portable music players, and portable game consoles; coating and surfaces of automobile exteriors, plano, quality furniture, marble or the like; protective glass for art work display, show windows, show cases, advertising covers, photo-frame covers, watches, window glass in automobiles, trains and aircraft, automobile headlamps and taillamps, members of transparent glass or transparent plastics (e.g., acrylic resins, polycarbonate), and various mirror members.

When the inventive fluorinated siloxane acrylate is added to a UV-curable resist liquid and a resist coating is exposed to light and cured, there can be established a large difference in liquid repellency between a resist surface and an area where the resist is removed. This prevents a developer or liquid crystal solution from remaining on or staining a resist resin surface.

EXAMPLES

Examples and Comparative Examples are given below for illustrating the invention although the invention is not limited thereto. Notably, $^1$H-NMR analysis was carried out using Ultra Shield 400 Plus (Bruker Corp.). Herein Me stands for methyl.

Example 1-1

In dry nitrogen atmosphere, a 5,000-mL three-neck flask equipped with a reflux condenser and stirrer was charged with 1,255 g of compound having the following formula (13), 665 g of tetramethyldisiloxane, 1,255 g of methyl ethyl ketone, and 20 g of methanesulfonic acid, and with stirring, cooled at 5° C. After 71 g of deionized water was added dropwise, stirring was continued for 3 hours while maintaining an internal temperature of 0-10° C. Thereafter, 100 g of hydrotalcite (Kyowaad 500SH by Kyowa Chemical Industry Co., Ltd.) was added, and stirring was continued for 2 hours while maintaining an internal temperature of 0-10° C. The solvent and excess tetramethyldisiloxane were distilled off under reduced pressure and the hydrotalcite was filtered off, yielding 1,130 g of a colorless clear liquid having the following formula (14).

[Chem. 34]

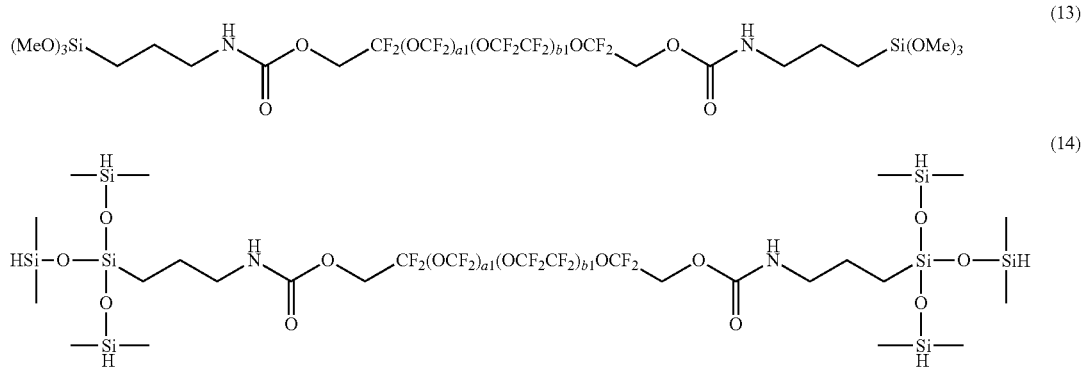

Herein a1≥1, b1≥1, a1/b1=0.76, the arrangement of repeat units within parentheses with a1 and b1 is indefinite, and the perfluoropolyether chain has a number average molecular weight of 1,500.

In dry nitrogen atmosphere, 190 g of compound (14) was mixed with 117 g of allyloxytrimethylsilane, 229 g of toluene, and 4.3 g of a toluene solution of chloroplatinic acid/vinylsiloxane complex (containing $8.3 \times 10^{-5}$ mol of Pt element), which was stirred at 80° C. for 2 hours. After the disappearance of signals assigned to Si—H group was confirmed by $^1$H-NMR and FT-IR analyses, the solvent and excess allyloxytrimethylsilane were distilled off under reduced pressure. This was followed by active carbon treatment and filtration, yielding 230 g of a pale yellow clear liquid having the following formula (15).

Herein a1≥1, b1≥1, a1/b1=0.76, the arrangement of repeat units within parentheses with a1 and b1 is indefinite, and the perfluoropolyether chain has a number average molecular weight of 1,500.

In dry nitrogen atmosphere, 2,300 g of methanol was added to 230 g of compound (15). The solution was heated and stirred at 67° C. for 12 hours. The by-product, trimethylmethoxysilane was distilled off under atmospheric pressure, and the excess methanol and trimethylsilane were distilled off under reduced pressure, yielding 197 g of a pale yellow clear liquid having the following formula (16).

[Chem. 33]

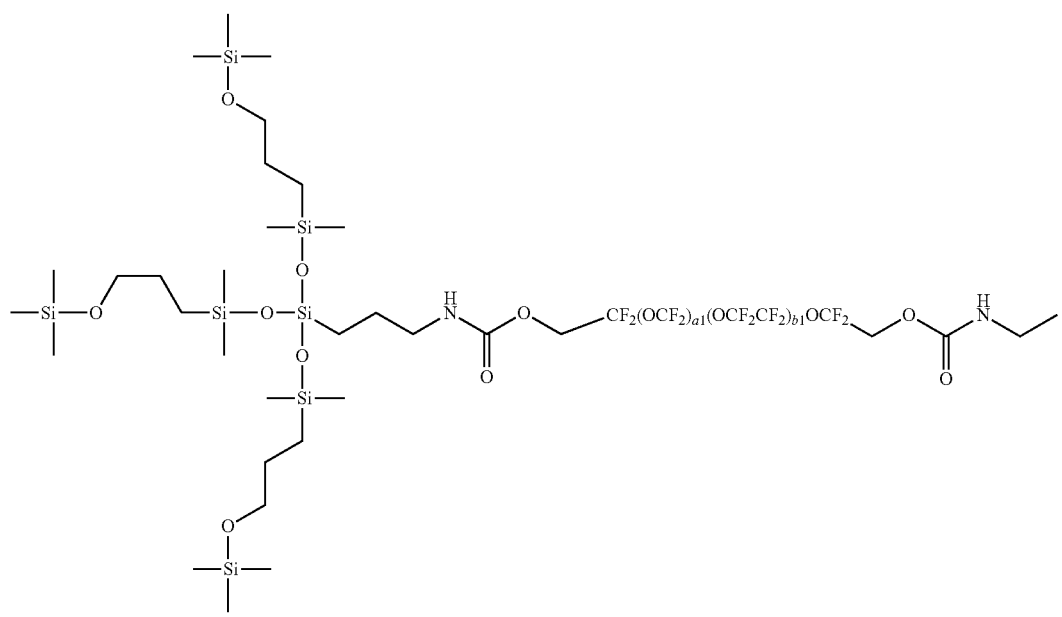

(15)

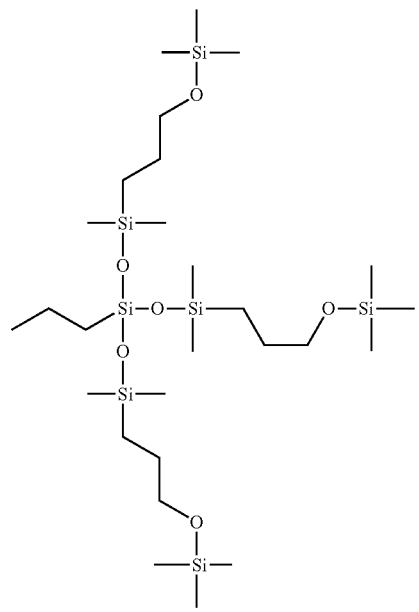

[Chem. 34]

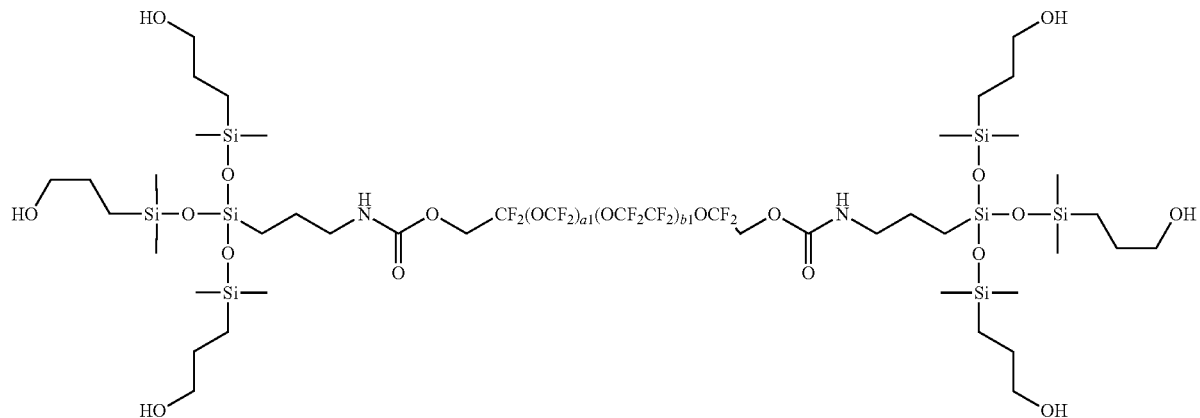

(16)

Herein $a1 \geq 1$, $b1 \geq 1$, $a1/b1 = 0.76$, the arrangement of repeat units within parentheses with a1 and b1 is indefinite, and the perfluoropolyether chain has a number average molecular weight of 1,500.

In dry nitrogen atmosphere, 41 g of triethylamine and 505 g of hexafluoro-m-xylene were added to 101 g of compound (16), and with stirring, the solution was heated at 60° C. To the solution, 25 g of acrylic chloride diluted with 50 g of toluene was added dropwise while maintaining an internal temperature of 55-60° C. Stirring was continued for 30 minutes. Then 5.8 g of ethanol was added dropwise while maintaining an internal temperature of 55-60° C. Stirring was continued for 1 hour. The precipitated salt was filtered off. To the filtrate, 5.6 g of hydrotalcite (Kyowaad 500SH by Kyowa Chemical Industry Co., Ltd.) and 5.6 g of aluminum silicate (Kyowaad 700 by Kyowa Chemical Industry Co., Ltd.) were added, followed by 2 hours of stirring. The solvent was distilled off under reduced pressure and the hydrotalcite and aluminum silicate were filtered off, yielding 56 g of a pale yellow clear liquid.

On $^1$H-NMR analysis, the product was identified to be a fluorinated siloxane acrylate having the following formula (17). Chemical shifts of the $^1$H-NMR spectrum are shown in Table 1.

[Chem. 35]

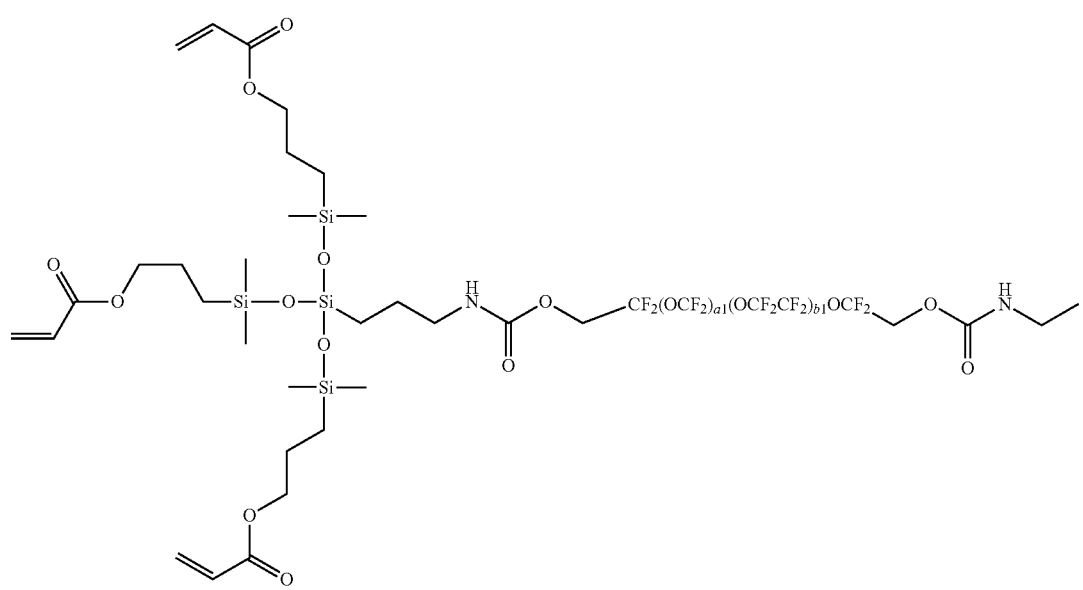

(17)

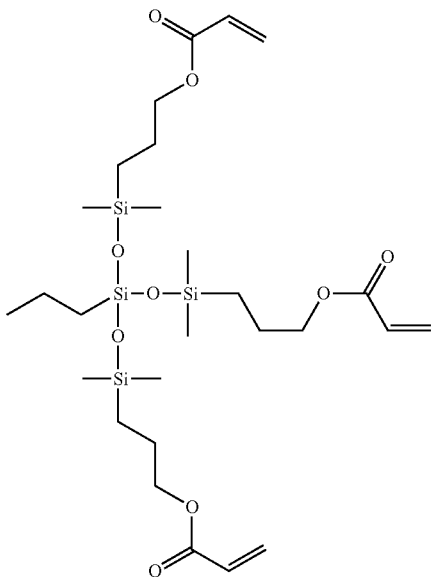

Herein a1≥1, b1≥1, a1/b1=0.76, the arrangement of repeat units within parentheses with a1 and b1 is indefinite, and the perfluoropolyether chain has a number average molecular weight of 1,500.

TABLE 1

| δ (TMS standard) | | |
|---|---|---|
| 0-0.2 ppm | —Si<u>CH₃</u> | 36 H |
| 0.3-0.7 ppm | —Si—<u>CH₂</u>—CH₂—CH₂—O— | 12 H |
| | —Si—<u>CH₂</u>—CH₂—CH₂—NH— | 4 H |
| 1.4-1.9 ppm | —Si—CH₂—<u>CH₂</u>—CH₂—O— | 12 H |
| | —Si—CH₂—<u>CH₂</u>—CH₂—NH— | 4 H |
| 2.9-3.2 ppm | —Si—CH₂—CH₂—<u>CH₂</u>—NH— | 4 H |
| 3.7-4.2 ppm | —Si—CH₂—CH₂—<u>CH₂</u>—O— | 12 H |
| 4.2-4.5 ppm | —CF₂—<u>CH₂</u>—O— | 4 H |
| 5.2-5.6 ppm | —Si—CH₂—CH₂—CH₂—<u>NH</u>— | 2 H |
| 5.6-6.5 ppm | —<u>CH</u>=<u>CH₂</u> | 18 H |

Example 1-2

In dry nitrogen atmosphere, a 5,000-mL three-neck flask equipped with a reflux condenser and stirrer was charged with 1,237 g of compound having the following formula (18), 443 g of tetramethyldisiloxane, 1,237 g of methyl ethyl ketone, and 18 g of methanesulfonic acid, and with stirring, cooled at 5° C. After 48 g of ion-exchanged water was added dropwise, stirring was continued for 3 hours while maintaining an internal temperature of 0-10° C. Thereafter, 88 g of hydrotalcite (Kyowaad 500SH by Kyowa Chemical Industry Co., Ltd.) was added, and stirring was continued for 2 hours while maintaining an internal temperature of 0-10° C. After the solvent and excess tetramethyldisiloxane were distilled off under reduced pressure and the hydrotalcite was filtered off, yielding 1,256 g of a colorless clear liquid having the following formula (19).

[Chem. 36]

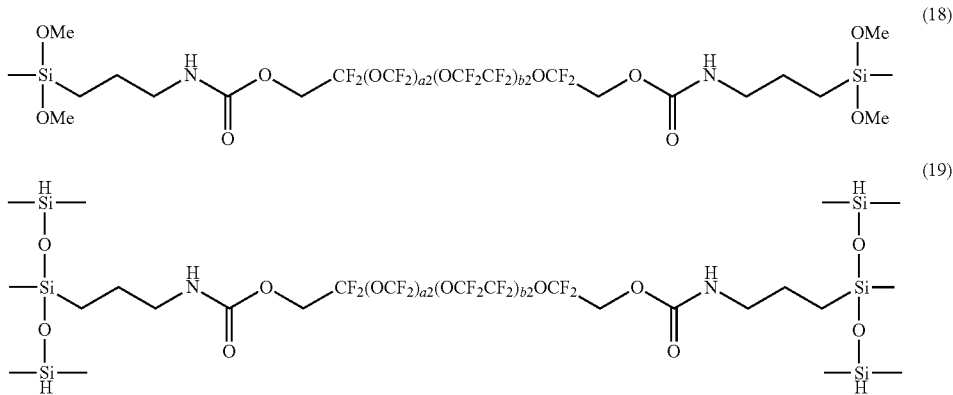

Herein a2≥1, b2≥1, a2/b2=0.76, the arrangement of repeat units within parentheses with a2 and b2 is indefinite, and the perfluoropolyether chain has a number average molecular weight of 1,500.

In dry nitrogen atmosphere, 363 g of compound (19) was mixed with 156 g of allyloxytrimethylsilane, 436 g of toluene, and 2.9 g of a toluene solution of chloroplatinic acid/vinylsiloxane complex (containing $7.3 \times 10^{-5}$ mol of Pt element), which was stirred at 80° C. for 2 hours. After the disappearance of signals assigned to Si—H group was confirmed by $^1$H-NMR and FT-IR analyses, the solvent and excess allyloxytrimethylsilane were distilled off under reduced pressure. This was followed by active carbon treatment and filtration, yielding 410 g of a pale yellow clear liquid having the following formula (20).

[Chem. 37]

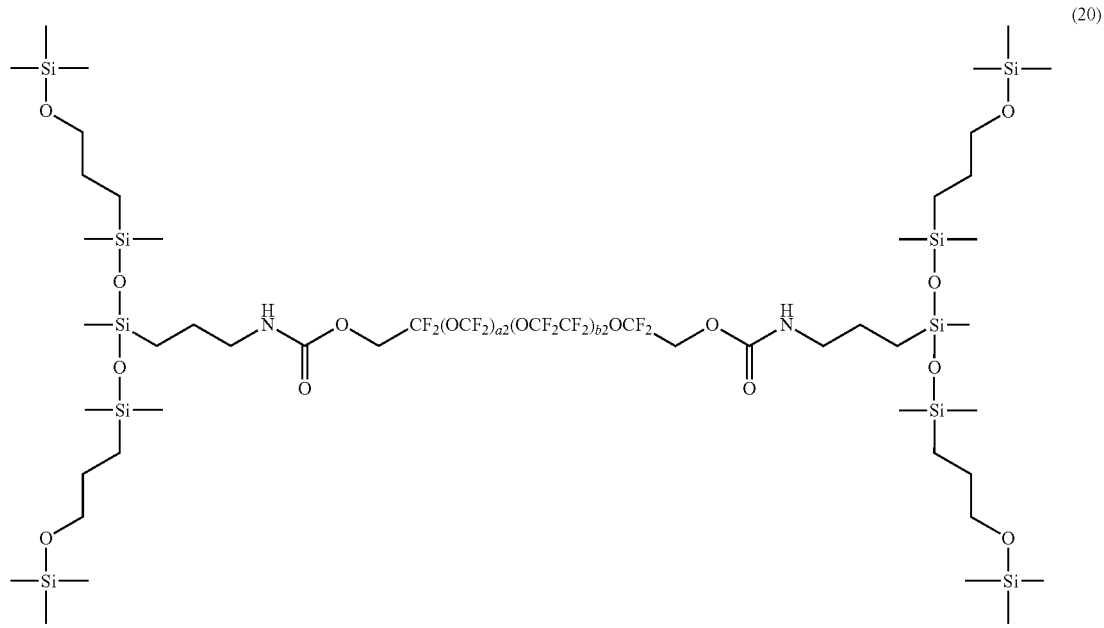

(20)

Herein a2≥1, b2≥1, a2/b2=0.76, the arrangement of repeat units within parentheses with a2 and b2 is indefinite, and the perfluoropolyether chain has a number average molecular weight of 1,500.

In dry nitrogen atmosphere, 2,300 g of methanol was added to 230 g of compound (20). The solution was heated and stirred at 67° C. for 12 hours. The by-product, trimethylmethoxysilane was distilled off under atmospheric pressure, and the excess methanol and trimethylsilane were distilled off under reduced pressure, yielding 180 g of a pale yellow clear liquid having the following formula (21).

[Chem. 38]

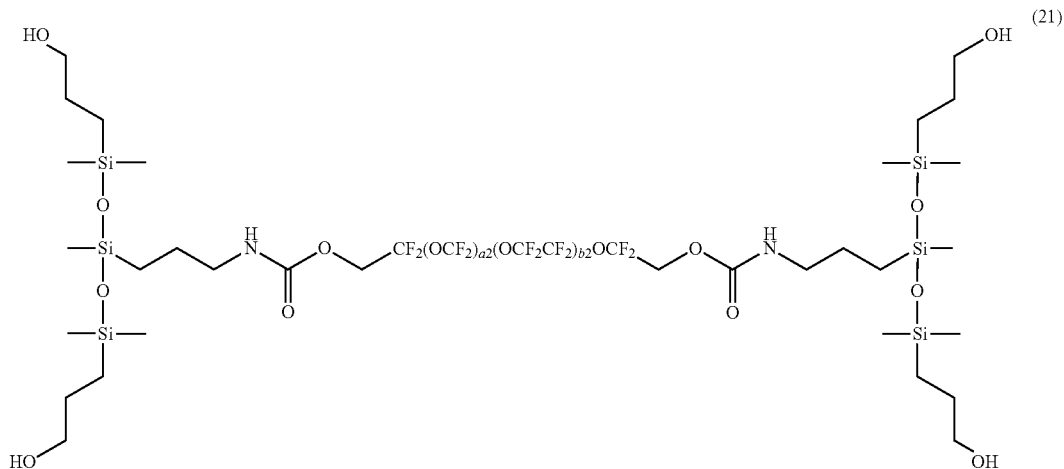

Herein a2≥1, b2≥1, a2/b2=0.76, the arrangement of repeat units within parentheses with a2 and b2 is indefinite, and the perfluoropolyether chain has a number average molecular weight of 1,500.

In dry nitrogen atmosphere, 34 g of triethylamine and 663 g of hexafluoro-m-xylene were added to 133 g of compound (21), and with stirring, the solution was heated at 60° C. To the solution, 20 g of acrylic chloride diluted with 40 g of toluene was added dropwise while maintaining an internal temperature of 55-60° C. Stirring was continued for 30 minutes. Then 1.8 g of ethanol was added dropwise while maintaining an internal temperature of 55-60° C. Stirring was continued for 1 hour. The precipitated salt was filtered off. To the filtrate, 7.4 g of hydrotalcite (Kyowaad 500SH by Kyowa Chemical Industry Co., Ltd.) and 7.4 g of aluminum silicate (Kyowaad 700 by Kyowa Chemical Industry Co., Ltd.) were added, followed by 2 hours of stirring. The solvent was distilled off under reduced pressure and the hydrotalcite and aluminum silicate were filtered off, yielding 102 g of a pale yellow clear liquid.

On $^1$H-NMR analysis, the product was identified to be a fluorinated siloxane acrylate having the following formula (22). Chemical shifts of the $^1$H-NMR spectrum are shown in Table 2.

[Chem. 39]

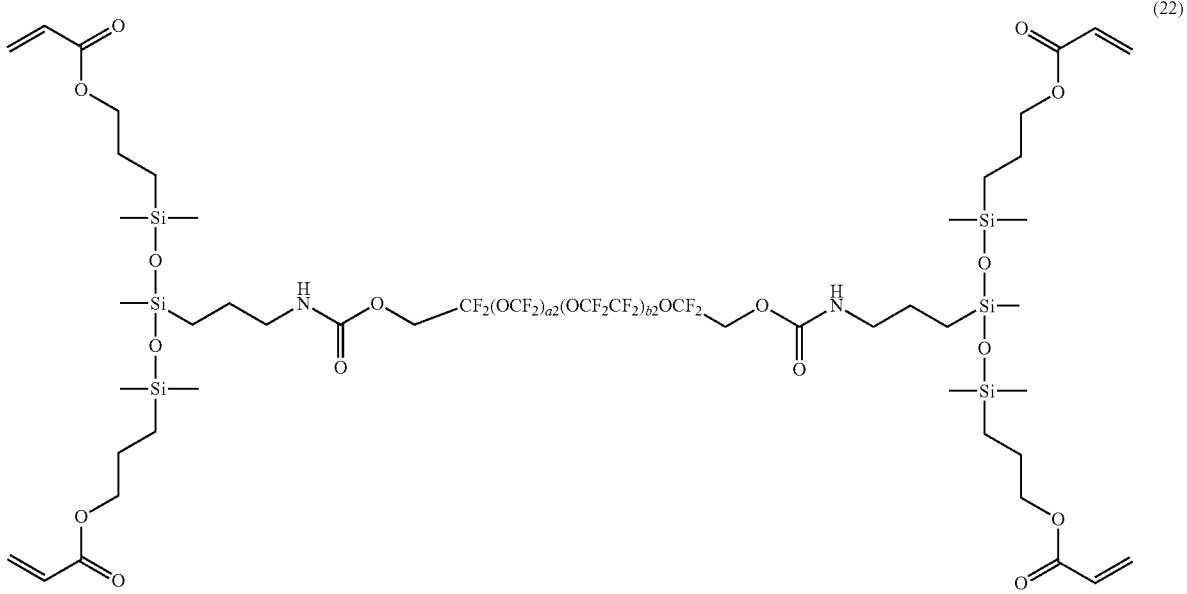

Herein a2≥1, b2≥1, a2/b2=0.76, the arrangement of repeat units within parentheses with a2 and b2 is indefinite, and the perfluoropolyether chain has a number average molecular weight of 1,500.

TABLE 2

| δ (TMS standard) | | |
|---|---|---|
| 0-0.2 ppm | —SiC$\underline{H_3}$ | 30 H |
| 0.3-0.7 ppm | —Si—$\underline{CH_2}$—CH$_2$—CH$_2$—O— | 8 H |
|  | —Si—$\underline{CH_2}$—CH$_2$—CH$_2$—NH— | 4 H |
| 1.4-1.9 ppm | —Si—CH$_2$—$\underline{CH_2}$—CH$_2$—O— | 8 H |
|  | —Si—CH$_2$—$\underline{CH_2}$—CH$_2$—NH— | 4 H |
| 2.9-3.2 ppm | —Si—CH$_2$—$\underline{CH_2}$—CH$_2$—NH— | 4 H |
| 3.7-4.2 ppm | —Si—CH$_2$—CH$_2$—$\underline{CH_2}$—O— | 8 H |
| 4.2-4.5 ppm | —CF$_2$—C$\underline{H_2}$—O— | 4 H |
| 5.2-5.6 ppm | —Si—$\underline{CH_2}$—CH$_2$—CH$_2$—NH— | 2 H |
| 5.6-6.5 ppm | —C$\underline{H}$=C$\underline{H_2}$ | 12 H |

Example 1-3

In dry nitrogen atmosphere, 121 g of compound (19) was mixed with 41 g of allyl glycol, 121 g of toluene, and 0.85 g of a toluene solution of chloroplatinic acid/vinylsiloxane complex (containing 2.2×10$^{-5}$ mol of Pt element), which was stirred at 80° C. for 2 hours. After the disappearance of signals assigned to Si—H group was confirmed by $^1$H-NMR and FT-IR analyses, the solvent and excess allyl glycol were distilled off under reduced pressure. This was followed by active carbon treatment and filtration, yielding 122 g of a pale yellow clear liquid having the following formula (23).

[Chem. 40]

Herein a2≥1, b2≥1, a2/b2=0.76, the arrangement of repeat units within parentheses with a2 and b2 is indefinite, and the perfluoropolyether chain has a number average molecular weight of 1,500.

In dry nitrogen atmosphere, 27 g of triethylamine and 707 g of hexafluoro-m-xylene were added to 141 g of compound (23), and with stirring, the solution was heated at 60° C. To the solution, 20 g of acrylic chloride diluted with 40 g of toluene was added dropwise while maintaining an internal temperature of 55-60° C. Stirring was continued for 30 minutes.

Then 1.8 g of ethanol was added dropwise while maintaining an internal temperature of 55-60° C. Stirring was continued for 1 hour. The precipitated salt was filtered off. To the filtrate, 7.9 g of hydrotalcite (Kyowaad 500SH by Kyowa Chemical Industry Co., Ltd.) and 7.9 g of aluminum silicate (Kyowaad 700 by Kyowa Chemical Industry Co., Ltd.) were added, followed by 2 hours of stirring. The solvent was distilled off under reduced pressure and the hydrotalcite and aluminum silicate were filtered off, yielding 112 g of a pale yellow clear liquid.

On $^1$H-NMR analysis, the product was identified to be a fluorinated siloxane acrylate having the following formula (24). Chemical shifts of the $^1$H-NMR spectrum are shown in Table 3.

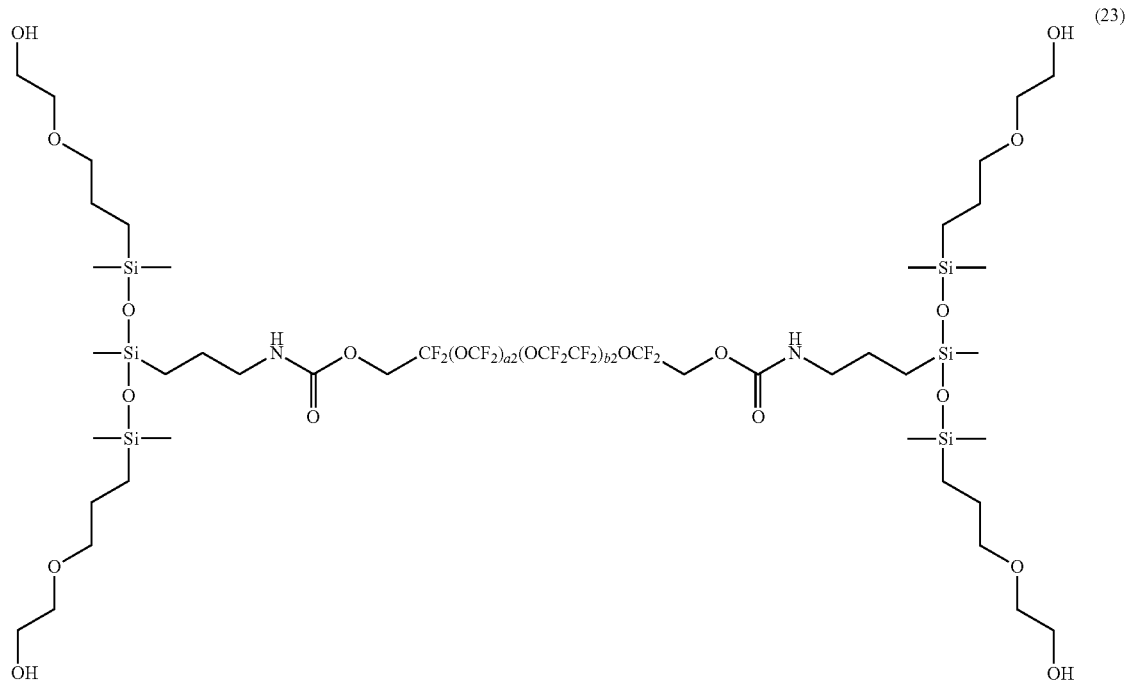

[Chem. 41]

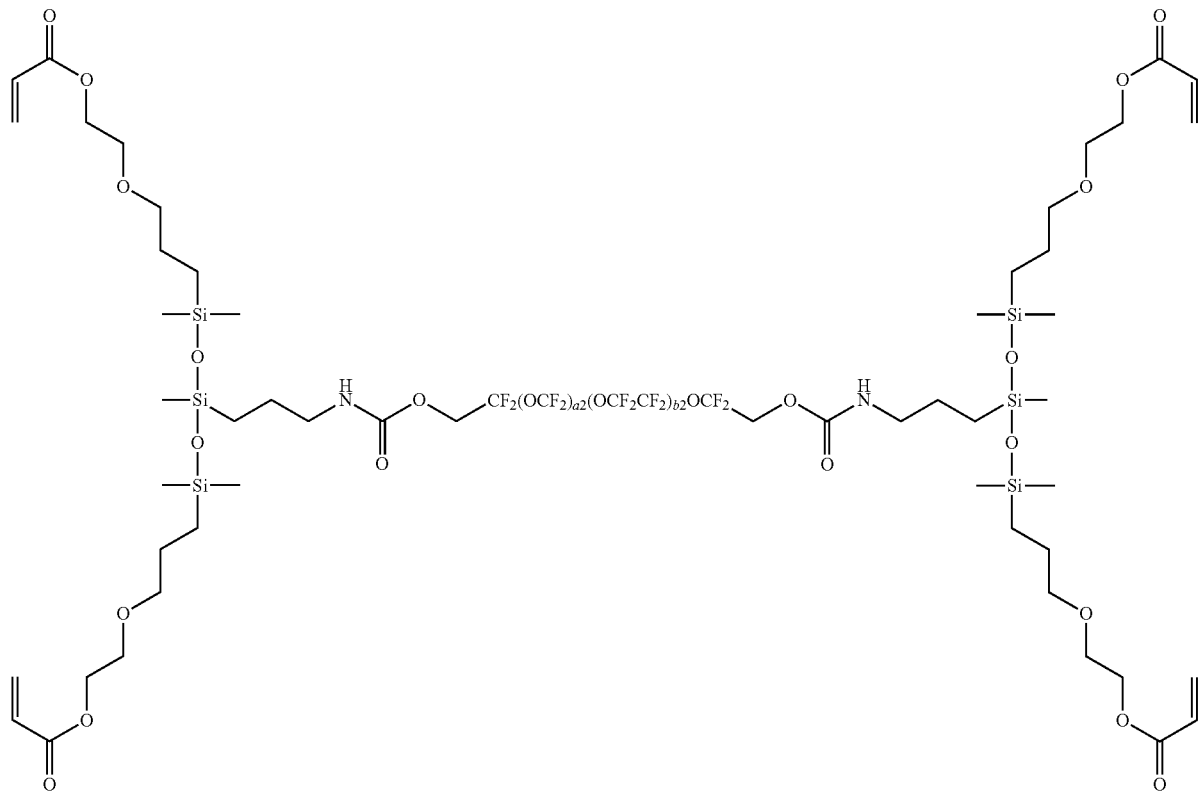

(24)

Herein a2≥1, b2≥1, a2/b2=0.76, the arrangement of repeat units within parentheses with a2 and b2 is indefinite, and the perfluoropolyether chain has a number average molecular weight of 1,500.

TABLE 3

| shift (TMS standard) | | |
|---|---|---|
| 0-0.2 ppm | —Si—$\underline{CH_3}$ | 30 H |
| 0.3-0.7 ppm | —Si—$\underline{CH_2}$—$CH_2$—$CH_2$—O— | 8 H |
| | —Si—$\underline{CH_2}$—$CH_2$—$CH_2$—NH— | 4 H |
| 1.4-1.9 ppm | —Si—$CH_2$—$\underline{CH_2}$—$CH_2$—O— | 8 H |
| | —Si—$CH_2$—$\underline{CH_2}$—$CH_2$—NH— | 4 H |

TABLE 3-continued

| shift (TMS standard) | | |
|---|---|---|
| 2.9-3.2 ppm | —Si—$CH_2$—$CH_2$—$\underline{CH_2}$—NH— | 4 H |
| 3.7-4.2 ppm | —Si—$CH_2$—$CH_2$—$\underline{CH_2}$—O— | 8 H |
| | —Si—$CH_2$—$CH_2$—$CH_2$—O—$\underline{CH_2}$—$CH_2$—O— | 8 H |
| | —Si—$CH_2$—$CH_2$—$CH_2$—O—$CH_2$—$\underline{CH_2}$—O— | 8 H |
| 4.2-4.5 ppm | —$CF_2$—$\underline{CH_2}$—O— | 4 H |
| 5.2-5.6 ppm | —Si—$CH_2$—$CH_2$—$CH_2$—$\underline{NH}$— | 2 H |
| 5.6-6.5 ppm | —$\underline{CH{=}CH_2}$ | 12 H |

Comparative Example 1-1

Fluorinated siloxane acrylate having the following formula (25)

[Chem. 42]

(25)

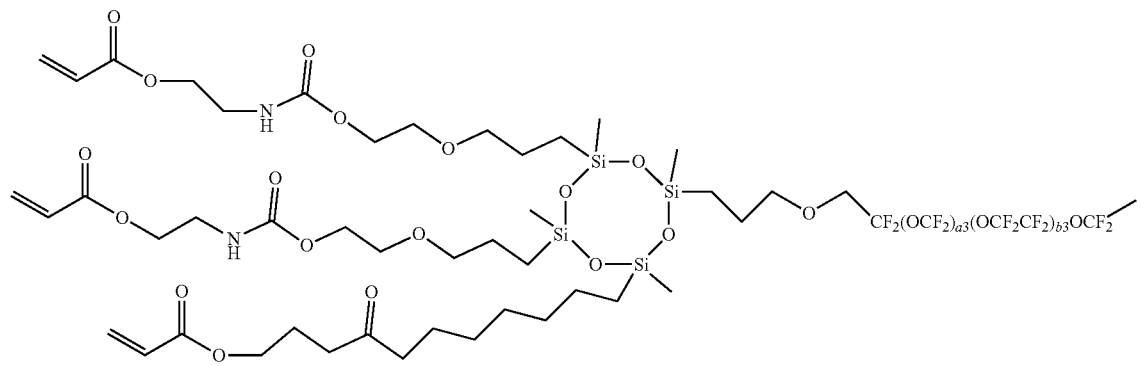

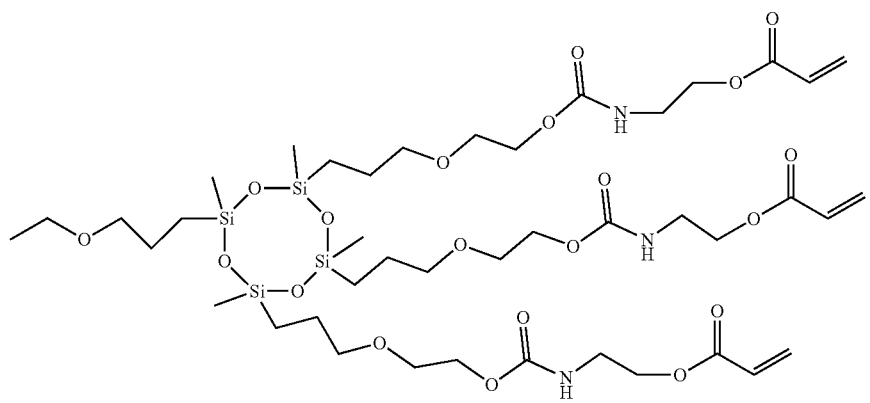

Herein a3≥1, b3≥1, a3/b3=0.76, the arrangement of repeat units within parentheses with a3 and b3 is indefinite, and the perfluoropolyether chain has a number average molecular weight of 2,000.

The fluorinated siloxane acrylates of Examples 1-1 to 1-3 and Comparative Example 1-1 were evaluated by the following tests, with the results shown in Table 4.

[Acrylic Equivalent]

A molecular weight per mole of acryloyl group was computed on the basis of the structure determined by the $^1$H-NMR spectroscopy analysis.

[Refractive Index]

A refractive index was measured at 25° C. by a refractometer (RX-7000α, Atago Co., Ltd.).

TABLE 4

| | Example 1-1 | Example 1-2 | Example 1-3 | Comparative Example 1-1 |
|---|---|---|---|---|
| Acrylic equivalent (g/mol) | 545 | 730 | 775 | 775 |
| Refractive index | 1.385 | 1.379 | 1.383 | 1.392 |

Examples 2-1 to 2-3 and Comparative Example 2-1

A coating composition was prepared by mixing 1 part by weight of the fluorinated siloxane acrylate (Examples 1-1 to 1-3 and Comparative Example 1-1) with 100 parts by weight of methyl isobutyl ketone, 100 parts by weight of tetrafunctional acrylate (A-TMMT by Shin-Nakamura Industry Co., Ltd.), and 2 parts by weight of 2-hydroxy-2-methyl-l-phenylpropanone (Omnirad 1173 by IGM Resins B.V.).

Comparative Example 2-2

A coating composition was prepared as in Examples 2-1 to 2-3 and Comparative Example 2-1 except that the fluorinated siloxane acrylate was omitted.

[Outer Appearance of Compositions]

The coating compositions of Examples 2-1 to 2-3 and Comparative Examples 2-1 to 2-2 were evaluated for outer appearance by visual observation. The results are shown in Table 5.

[Outer Appearance of Coatings]

Each of the coating compositions of Examples 2-1 to 2-3 and Comparative Examples 2-1 to 2-2 was spin coated onto a polycarbonate plate. Using a conveyor type UV irradiation system (Eye Graphics Co., Ltd.), the coating was irradiated in nitrogen atmosphere with UV radiation in a dose of 600 mJ/cm$^2$ to form a cured film, which was evaluated for outer appearance by visual observation. The results are shown in Table 5.

[Contact Angle with Water and Hexadecane]

Using a contact angle meter (Kyowa Interface Science Co., Ltd.), the cured film prepared in the above coating outer appearance test was measured for contact angle with water and hexadecane. The results are shown in Table 5.

TABLE 5

|  | Example 2-1 | Example 2-2 | Example 2-3 | Comparative Example 2-1 | Comparative Example 2-2 |
|---|---|---|---|---|---|
| Siloxane acrylate | Example 1-1 | Example 1-2 | Example 1-3 | Comparative Example 1-1 | nil |
| Composition appearance | colorless, transparent | colorless, transparent | colorless, transparent | colorless, transparent | colorless, transparent |
| Coating appearance | colorless, transparent | colorless, transparent | colorless, transparent | colorless, transparent | colorless, transparent |
| Contact angle with water (°) | 109 | 109 | 109 | 109 | 60 |
| Contact angle with hexadecane (°) | 63 | 63 | 62 | 63 | 22 |

As seen from Table 4, the fluorinated siloxane acrylates of Examples 1-1 to 1-3 have a lower refractive index than Comparative Example 1, despite a lower acrylic equivalent (g/mol) or a greater acrylic concentration per unit weight.

As seen from Table 5, the fluorinated siloxane acrylates within the scope of the invention give an outer appearance, contact angle with water and contact angle with hexadecane equivalent to Comparative Example 1-1, indicating that they are soluble and antifouling.

It has been demonstrated that due to improved solubility, low refractive index, and antifouling properties, the fluorinated siloxane acrylates of the invention are not only useful as an additive to coating compositions to glass, resins, films, paper, metals, porcelain, and wood, protective film-forming compositions to printed matter surface, and paint compositions, but also useful as an additive to low reflection films.

The invention claimed is:

1. A fluorinated siloxane acrylate having the formula (1):

$$X-Z-PFPE-Z-X \quad (1)$$

wherein PFPE is a divalent perfluoropolyether chain having a number average molecular weight of 500 to 30,000, X is each independently a group having the formula (2):

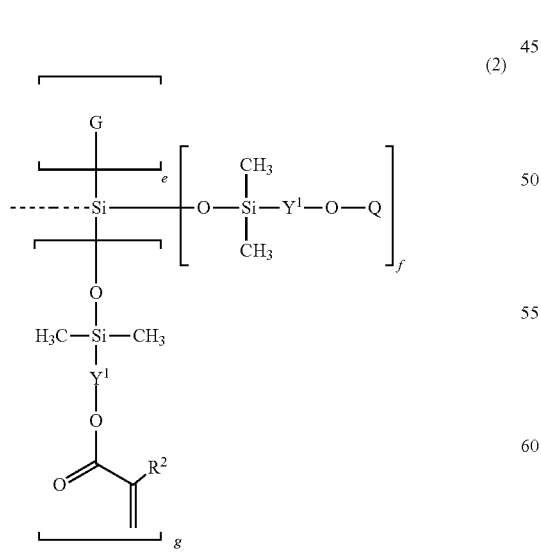

wherein $Y^1$ is each independently a divalent organic group having any one of the following formulae:

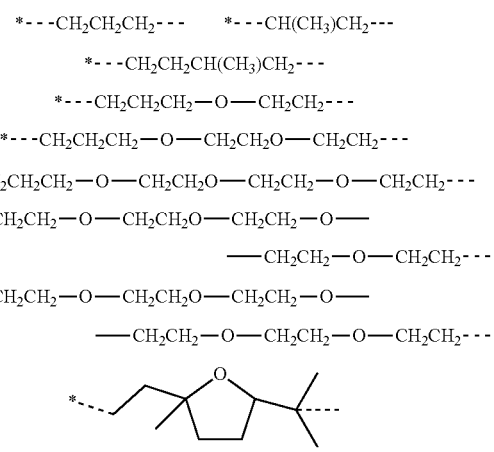

wherein the broken line designates a valence bond, and the asterisk (*) designates a point of attachment to the silicon atom, $R^2$ is each independently hydrogen, fluorine, methyl or trifluoromethyl, and G is each independently a $C_1$-$C_{12}$ alkyl group or a group having the formula (3):

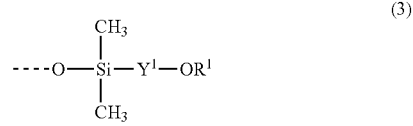

wherein $R^1$ is a $C_1$-$C_{12}$ monovalent hydrocarbon group, $Y^1$ is as defined above, and the broken line designates a valence bond, Q is hydrogen or a group having the formula (4):

wherein $R^3$ is each independently a $C_1$-$C_{12}$ monovalent hydrocarbon group and the broken line designates a valence bond, e is an integer of 0 to 2, f is an integer of 0 to 2, and g is an integer of 1 to 3, and e+f+g=3, and the broken line designates a valence bond, Z is each independently a divalent organic group having any one of the following formulae:

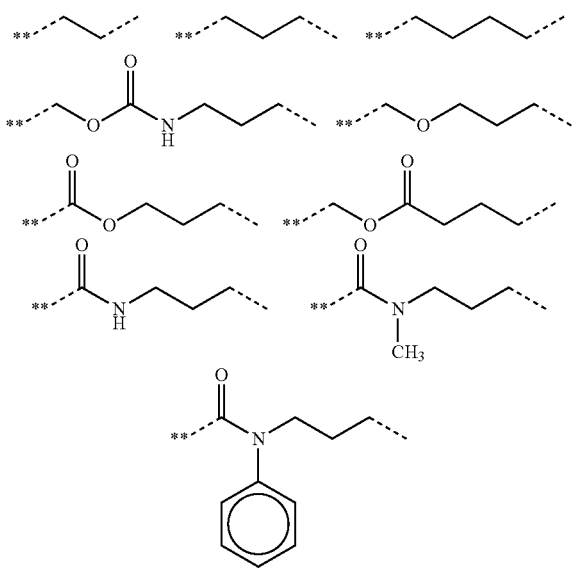

wherein the broken line designates a valence bond, and the double asterisk (**) designates a point of attachment to the PFPE.

2. The fluorinated siloxane acrylate of claim 1 wherein PFPE is a perfluoropolyether chain having a number average molecular weight of 1,000 to 5,000, represented by the following formula:

$$- - - CF_2(OCF_2)_a(OCF_2CF_2)_bOCF_2- - - \quad (6)$$

wherein a is a number of at least 1, b is a number of at least 1, a/b is a number from 1/10 to 10/1, the arrangement of repeating units in parentheses with a and b may be arbitrary, and the broken line designates a valence bond.

3. The fluorinated siloxane acrylate of claim 1 wherein Z is a divalent organic group having any one of the following formulae:

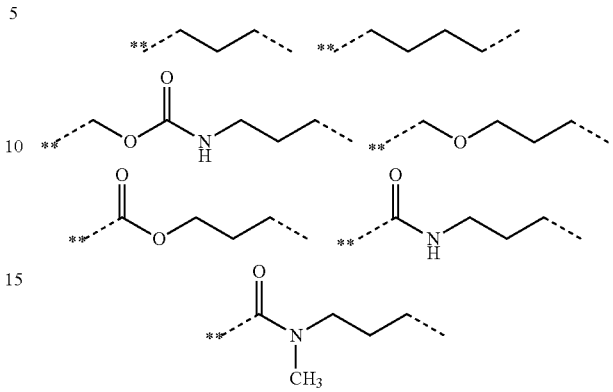

wherein the broken line designates a valence bond, and the double asterisk (**) designates a point of attachment to the PFPE.

4. The fluorinated siloxane acrylate of claim 1 wherein e is 1 or 2, G is a $C_1$-$C_6$ alkyl group or a group having formula (3) wherein $R^1$ is methyl, ethyl or n-propyl.

5. The fluorinated siloxane acrylate of claim 4 wherein G is a $C_1$-$C_3$ alkyl group.

6. The fluorinated siloxane acrylate of claim 1 wherein e is 0.

7. A coating composition comprising the fluorinated siloxane acrylate of claim 1.

8. The coating composition of claim 7, further comprising an acrylate or urethane acrylate other than the fluorinated siloxane acrylate having the formula (1).

9. An article comprising a coating in the form of a cured product of the coating composition of claim 7.

* * * * *